(12) United States Patent
Sado et al.

(10) Patent No.: US 7,264,389 B2
(45) Date of Patent: Sep. 4, 2007

(54) ILLUMINATING UNIT AND DISPLAY DEVICE USING THE UNIT

(75) Inventors: Takayasu Sado, Chiba (JP); Makoto Kurihara, Chiba (JP); Katsunori Honma, Chiba (JP); Naofumi Yamauchi, Chiba (JP)

(73) Assignee: Seiko Instruments Inc. (JP)

( * ) Notice: Subject to any disclaimer, the term of this patent is extended or adjusted under 35 U.S.C. 154(b) by 181 days.

(21) Appl. No.: 11/048,937

(22) Filed: Feb. 2, 2005

(65) Prior Publication Data

US 2005/0180165 A1    Aug. 18, 2005

(30) Foreign Application Priority Data

Feb. 17, 2004 (JP) ............................. 2004-040353
Feb. 24, 2004 (JP) ............................. 2004-047381
Jan. 26, 2005 (JP) ............................. 2005-018354

(51) Int. Cl.
*F21V 7/04* (2006.01)
(52) U.S. Cl. .................. 362/628; 362/615; 385/901
(58) Field of Classification Search .............. 362/606, 362/607, 608, 612, 617, 620, 558; 385/47, 385/50
See application file for complete search history.

(56) References Cited

U.S. PATENT DOCUMENTS 6,366,409 B1 * 4/2002 Umemoto et al. .......... 359/628
6,735,373 B2 * 5/2004 Umemoto .................... 385/146

* cited by examiner

*Primary Examiner*—John Anthony Ward
(74) *Attorney, Agent, or Firm*—Adams & Wilks

(57) ABSTRACT

Adjustments during assembly of an illuminating unit having a conventional light pipe in order to position the light pipe and a light guide plate are laborious. Further, a minute prism group having a pitch on the order of 100 μm must be provided to a side surface of the light pipe in order to uniformly guide illuminating light to the light guide plate. An illuminating unit of the present invention is provided with a light guide plate having an illuminating surface that is illuminated by light from a point light source, and a light pipe having an incident surface to which light from the point light source is made incident and an emerging portion from which the light emerges to the light guide plate. The emerging portion and the light guide plate are integrally joined.

18 Claims, 6 Drawing Sheets

ILLUMINATING UNIT AND DISPLAY DEVICE USING THE UNIT

BACKGROUND OF THE INVENTION

1. Field of the Invention

The present invention relates to a display device used in a cellular telephone, a portable small television, a portable game player, a personal digital assistant (PDA), a small size laptop computer, and the like. In particular, the present invention relates to an illuminating unit called a back light or a front light, and to a display device that uses the illuminating unit.

2. Description of the Related Art

Light emitting diodes (hereinafter called LEDs) are often used as light sources having good turn-on characteristics, with little generated heat or noise, in display devices employed in electronic equipment. In general, a transmitting type color liquid crystal display device displays color images by illuminating liquid crystal display elements provided with a red (R), green (G), or blue (B) filter using a back light illuminating unit that uses a white color LED light source. However, ideal white color LED light sources capable of emitting white light do not exist, and devices have been contrived in order to achieve very natural color representation.

A method disclosed in JP 2002-57376 A, for example, is known as a typical recent method. This method is one in which blue color light emitted from a blue color LED light source provided with a fluorescent material excites the fluorescent material, thus obtaining light from green color light to red color light according to wavelength conversion. The light obtained by wavelength conversion is added to the blue color light, thus obtaining quasi-white color light. At the same time, red color light emitted from a red color LED light source is further added to the quasi-white color light, thus obtaining nearly ideal white color light. The white light is guided to a light guide plate, and illuminates liquid crystal display elements. Using this method, the nearly ideal white color light can be obtained simply by only performing output adjustments on the red color LED light source. A liquid crystal display device capable of clear color display can thus be achieved. It is necessary to mix the quasi-white color light and the red color light very efficiently, without color shifting, in order to obtain the nearly ideal white color light. However, a method may be used for mixing in which the blue color LED light source, which is provided with the fluorescent material, and the red color LED light source are disposed at both ends of a light pipe as a first LED light source, which is provided with the fluorescent material, and a second LED light source, respectively. The quasi-white color light and the red color light may be uniformly mixed within the light pipe.

On the other hand, with an illuminating unit such as a back light or a front light, a light source is disposed opposing an end surface of a light guide plate so that light emitted from the light source becomes incident from one end surface of the light guide plate. An illuminating unit having this type of light source arrangement is called a side light type illuminating unit. The side light type illuminating unit having LEDs thus disposed is easier to make smaller and thinner, and has a high light utilization efficiency. A plane emission configuration (refer to JP 3301752 B, for example) is known in which a light pipe is disposed on a side surface of a light guide plate, and light emitted from a light source is guided to the light guide plate through the light pipe. As disclosed in JP 3301752 B, a minute prism group may also be provided in a surface of the light guide plate of an illuminating unit that uses a side light type light pipe. The minute prism group is aligned in parallel with a longitudinal direction of the light pipe in order to make light illuminating an object to be illuminated more uniform. In addition, a minute prism group may also be provided to the light pipe itself, thus unifying the intensity distribution of light emitted from the light pipe and at the same time increasing the utilization efficiency of the light.

However, it is necessary to separately align the positions of the light pipe and the light guide plate when performing illumination with a conventional side light type illuminating unit, that is, when performing illumination with a unit in which the light pipe is disposed in a side light style from one side of the light guide plate. Consequently, there is a problem in that it is labor intensive to make adjustments during assembly.

In addition, it is necessary to provide the minute prism group on the side surface of the light pipe at a pitch of about 100 μm in order to guide the illuminating light to the light guide plate side.

SUMMARY OF THE INVENTION

In view of the above problems, according to the present invention, there is provided an illuminating unit including: a point light source; a light guide plate having an illuminating surface that is illuminated by light from the point light source; a light pipe having an incident surface to which light from the point light source is made incident, and an emerging portion from which the incident light from the incident surface emerges; and a joining portion that integrally joins the emerging portion and the light guide plate. Here, the light pipe changes the direction of light incident from the incident surface, and then emits the light from the emerging portion.

Further, the light pipe is set to have an elliptical cylinder shape, and the incident surface is set to have an elliptical shape. Here, the emerging portion and the light guide plate are integrally joined so that the emerging portion of the light pipe includes an elliptical cylinder shape bus line. Here, the point light source is arranged so that the center of light emitted by the point light source is in the vicinity of at least one of two foci of the elliptical surface forming the incident surface of the light pipe.

Alternatively, the light pipe is set to have a prismatic shape and the incident surface is set to have a rectangular shape. The point light source is arranged so that the center of light emitted from the point light source is disposed in a position separated from at least one side of the rectangular shape incident surface of the light pipe by m/n (where m and n are each irreducible natural numbers other than 1, and m<n). Also, the joining portion is provided so as to uniformly join a bottom surface of the light pipe and a bottom surface of the light guide plate.

The illuminating unit is configured so that the thickness of the joining portion becomes larger with increasing distance from the point light source. Specifically, the thickness of the joining portion becomes linearly larger with increasing distance from the point light source. Alternatively, the thickness of the joining portion becomes quadratically larger with increasing distance from the point light source.

The illuminating unit further includes a prism formed in the incident surface of the light pipe, the prism having a depressed shape toward an inner side of the incident surface and having an apex point that coincides with the center of light emitted from the point light source.

The illuminating unit further includes minute scattering structure members provided in a bottom surface of the light guide plate, the haze value of the minute scattering structure members increasing with increasing distance from the light pipe.

Further, according to the present invention, there is provided a display device including: non-self light emitting display elements; and an illuminating unit that illuminates the display elements, and the illuminating unit includes: a point light source; a light guide plate having an illuminating surface that is illuminated by light from the point light source; a light pipe having an incident surface to which light from the point light source is made incident, and an emerging portion from which the incident light from the incident surface emerges; and a joining portion that integrally joins the emerging portion and the light guide plate. In other words, the display device according to the present invention includes the non-self light emitting display device elements and the illuminating unit having any one of the above-mentioned configuration for illuminating the display device.

DETAILED DESCRIPTION OF THE PREFERRED EMBODIMENTS

An illuminating unit of the present invention is provided with a light pipe having an incident light surface, to which light from a point light source is made incident, and an emerging portion from which light from the point light source emerges out to a light guide plate. A joining member integrally connects the emerging portion of the light pipe and the light guide plate. It is not necessary to perform positioning of the light pipe and the light guide plate during assembly because the light pipe and the light guide plate are integrated with this type of configuration. Further, the light pipe is also provided with a function for changing the direction of light made incident to the incident light surface, and then sending the light out from the emerging portion.

In addition, the light pipe is configured by an elliptical cylinder shape having an elliptical shape incident light surface. Further, the point light source is disposed so that the center of light emitted from the point light source is in the vicinity of at least one focal point position from among the two focal points of the elliptical shape of the incident light surface. According to this type of configuration, it becomes possible to efficiently guide uniformly emitted light to the light guide plate without providing a minute structure such as a minute prism group in a side surface of the light pipe. Furthermore, the mixing characteristics of light within the light pipe can be improved, and it becomes possible to emit light to the light guide plate with good efficiency, when a point light source having a combination of single color point light sources is used.

Alternatively, a prismatic shape light pipe having a rectangular shape incident light surface may be used. In addition, the joining member may be provided so that a bottom surface of the light pipe and a bottom surface of the light guide plate are integrated in a continuous manner. Further, the center of the light emitted by the point light source may be disposed in a position where at least one edge of the rectangular shape of the incident light surface is divided into a ratio of m/n (where m and n are each irreducible natural numbers other than 1, and m<n). According to this type of configuration, the mixing characteristics of light within the light pipe can be improved, and it becomes possible to make light incident to the light guide plate with good efficiency.

Further, the thickness of the joining portion may become thicker with increasing distance from the point light source. According to this type of configuration, it becomes possible to efficiently guide uniformly emitted light to the light guide plate without providing a minute structure such as a minute prism group in the side surface of the light pipe. Specifically, the thickness of the joining portion may be set to increase linearly or quadratically with distance from the point light source.

In addition, a prism having a shape depressed toward an inner side, whose apex substantially coincides with the center of the light emitted by the point light source, may be provided in the incident light surface of the light pipe (without depending upon the shape of the incident light surface). According to this type of configuration, the utilization efficiency of light can be improved, regardless of the fact that the structure is a far more simple structure than that of a conventional light pipe provided with a minute prism group.

Further, minute scattering member structures may be provided in the bottom surface of the light guide plate so that the noise value becomes larger with increasing distance from the light pipe. According to this type of configuration, it becomes possible to effectively and uniformly illuminate light from the light pipe to an object to be illuminated such as a liquid crystal display device.

Furthermore, a display device that is bright and that has a high degree of color saturation can be achieved by using this type of illumination unit for illuminating non-self illuminating display elements.

Embodiments of the present invention are explained in detail below based on the appended drawings.

Embodiment 1

Figure 1:
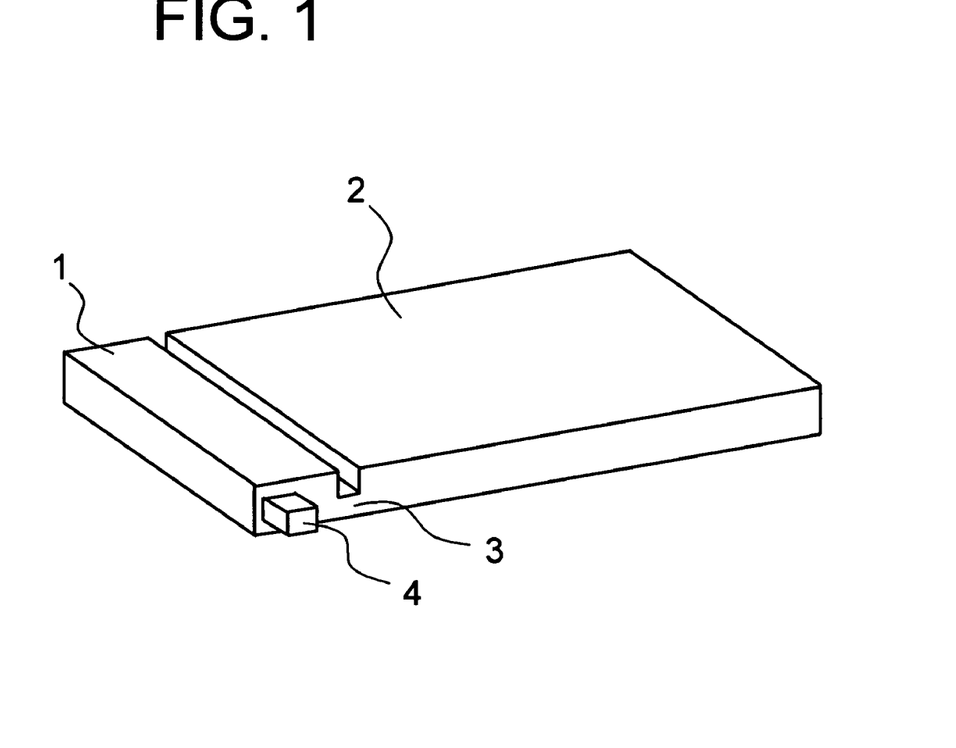
FIG. 1 is an external perspective view that schematically shows an illuminating unit of the present invention.

FIG. 1 schematically shows an external view of an illuminating unit according to this embodiment. Referring to FIG. 1, a light pipe 1 has a substantially rectangular parallelepiped shape. A short edge side of the rectangular parallelepiped is disposed facing a light guide plate side. A portion of a bottom surface side of the light pipe 1 is integrally connected to a portion of a bottom surface side of a light guide plate 2 through a joining portion 3. Further, an LED light source 4 is disposed on an end surface of the light pipe 1 in its longitudinal direction. The light pipe 1, the joining portion 3, and the light guide plate 2 are all formed by using the same transparent polymer material.

Figure 2:
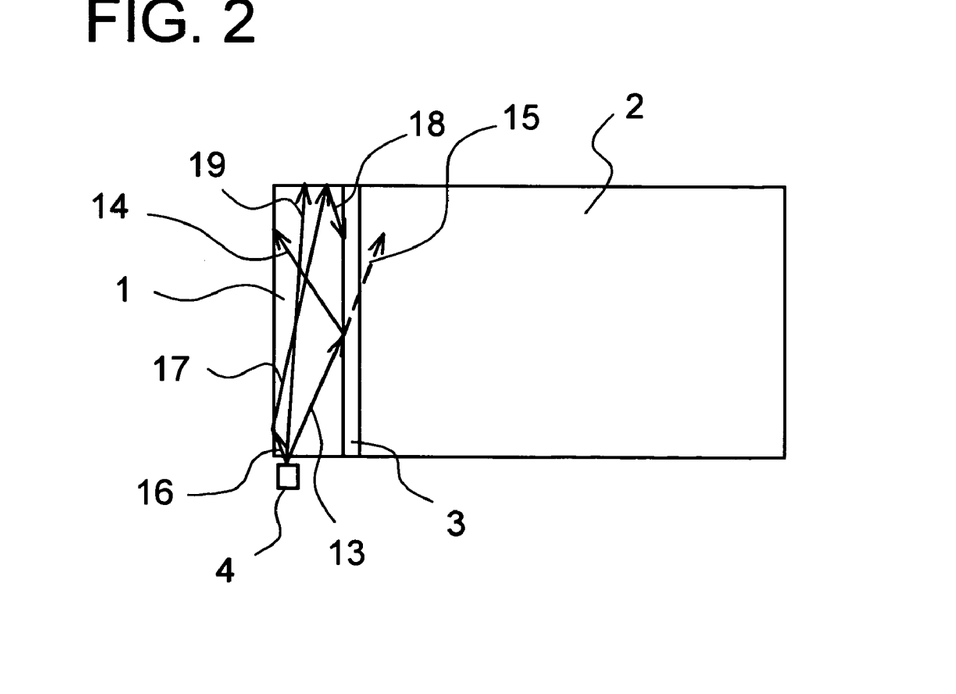
FIG. 2 is a planar view that schematically shows light propagation within a light pipe.

Light emitted from the LED light source 4 is made incident on an incident surface of the light pipe 1 and propagates within the light pipe 1 in the longitudinal direction thereof. A portion of the transmitted light that becomes incident to the side surface at a large angle of incidence, equal to or greater than a critical angle, propagates in an inner portion of the light pipe 1 while being completely and repeatedly reflected. On the other hand, a portion of the light passes through an emerging portion of the light pipe 1 at the side surface thereof when made incident at an angle of incidence less than the critical angle. The light that passes through becomes incident to the light guide plate, while the remaining portion of the light is reflected. This type of optical propagation is explained using FIG. 2. Referring to FIG. 2, a light ray 13 emitted from the LED light source 4 is discussed first. The light ray 13 is made incident to an inner wall of the light guide plate side of the light pipe 1 at an angle equal to or greater than the critical angle. Accordingly, the light ray 13 is completely reflected by the inner wall of the light guide plate side, and propagates within the inner portion of the light pipe 1 as a light ray 14. At this point, light from the light ray 13 that emerges or exits from the emerging portion of the light pipe 1 becomes incident to the joining portion 3 and passes through the joining portion 3 as is, becoming a light ray 15 that is illuminated to an inner portion of the light guide plate 2. A light ray 16 that becomes incident to the inner wall of an outer side of the light pipe 1 at an angle equal to or greater than the critical angle is discussed next. The light ray 16 emitted from the LED light source 4 is completely reflected by the inner wall of the outer side of the light pipe 1, and becomes incident to a surface opposite an incident light surface of the light pipe as a light ray 17. The light ray 17 is again reflected by the opposing surface of the incident light surface of the light pipe 1, becoming a light ray 18, provided that the opposing surface has been given a reflecting function. The light ray 18 is once again completely reflected when becoming incident to the inner wall of the light guide plate side of portions other than the joining portion 3, returning to the inner portion. However, when the light ray 18 emerges or exits from the emerging portion of the light pipe 1 and is made incident to joining portion 3, the light ray 18 is illuminated as is to the inner portion of the light guide plate 2.

Further, when a light ray 19 emitted from the LED light source 4 and having a small angle is directly incident to the surface opposing the incident light surface of the light pipe 1, the light ray 19 is repeatedly reflected many times between the incident light surface of the light pipe 1 and the opposing surface, after which the light is illuminated to the light guide plate 1. This is because the angle of incidence of the light ray 19 to the opposing surface is small. It should be noted that since the angle at which the light ray 19 is incident to the surface opposing the incident light surface of the light pipe 1 in this case is small, a large proportion of the incident light ray 19 passes through the surface opposing the incident light surface of the light pipe 1, and escapes to an outside portion, resulting in light loss. In order to reduce this type of light loss, it is preferable to provide the surface opposing the incident light surface of the light pipe 1 with a reflecting function (not shown). Specifically, a reflective film of Ag, Al, or the like is provided, or a reflective plate is externally attached.

In general, minute prismatic structures or minute scattering members are provided to a bottom surface or an upper surface of the light guide plate 2 so that light incident to the light guide plate 2 is illuminated with good efficiency to an object to be illuminated, such as a color liquid crystal display device. On the other hand, in an illuminating unit in which a light source is disposed as shown in FIG. 2, the angle at which light from the light pipe 1 becomes incident to the light guide plate 2 becomes larger than that of a normal illuminating unit. Accordingly, if minute prismatic structures are provided to the bottom surface or the upper surface of the light guide plate 2, when light propagating in the inner portion of the light guide plate 2 becomes incident to a reflecting surface of the minute prismatic structure, the angle of incidence thereof will become large with respect to the reflecting surface. Consequently, although the minute prismatic structures act to change the direction of the light propagating in the inner portion of the light guide plate, the minute prismatic structures reduce an action whereby the propagating light is guided to the external portion. A target brightness distribution therefore cannot be obtained in the illuminating unit of the present invention when minute prismatic structures similar to conventional minute prismatic structures are used to configure the light guide plate 2. A method such as providing a minute prismatic structure having a light pipe side pitch that is finer than that of a conventional minute prismatic structure thus becomes necessary when providing the minute prismatic structures to the light guide plate.

Alternatively, minute scattering structure members not dependant on the propagation direction of the propagating light may be provided to the bottom surface or the upper surface of the light guide plate 2 in the illuminating unit of the present invention instead of the minute prismatic structures. The brightness distribution of an illumination surface of the light guide plate can thus be made more uniform. Members having an irregular minute roughness structure or members having a so-called grain-patterned structure may be provided as the minute scattering structure members. Minute scattering member having a haze value that becomes larger with distance from the light pipe 1 may be provided as the minute scattering structure members in order to uniformly illuminate light to the object to be illuminated. It should be noted that the term haze value used here means a ratio of overall scattered light intensity to overall incident light intensity.

Figure 3:
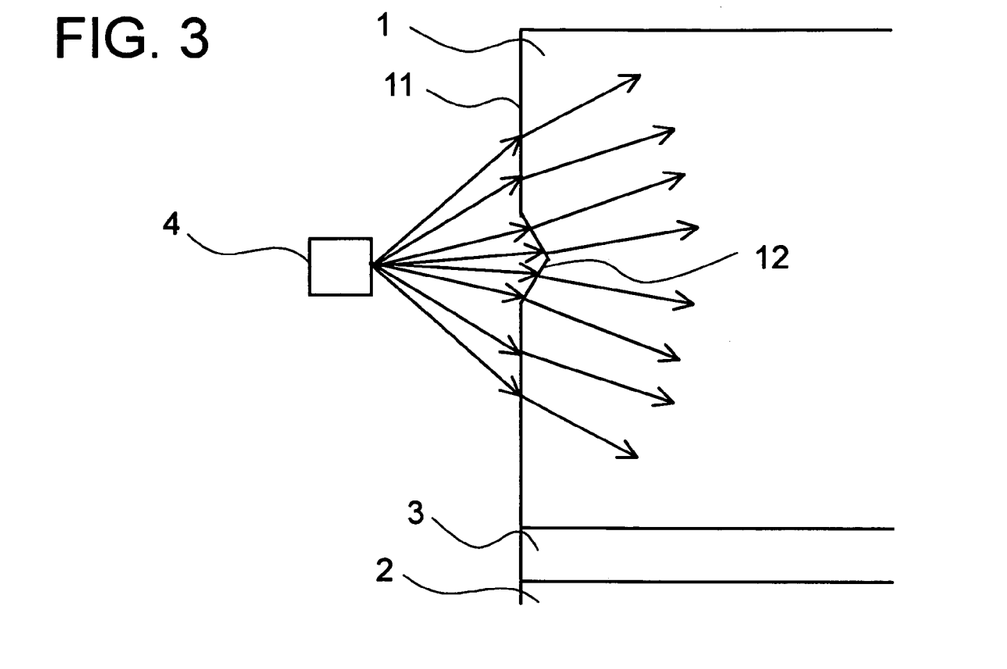
FIG. 3 is a planar view that schematically shows a prism provided on an incident surface of a light pipe.

As described above, light having a small emergence angle from the LED light source 4 is made incident to the light guide plate 2 after repeatedly going back and fourth within the light pipe 1 several times. This type of light has a small angle of incidence to the incident light surface of the light pipe and the opposing surface. Accordingly, a large portion of the light is transmitted to the external portion, and the utilization efficiency of the light that is made incident to the light guide plate 2 decreases. In order to increase the utilization efficiency of the light emitted from the LED light source 4 having a small emergence angle, a prism may be provided to an incident end surface of the light pipe 1. This type of prism is explained using FIG. 3. FIG. 3 is a planar view of the LED light source 4 and the light pipe 1 as seen from above, and schematically shows a prism 12 that is provided to the incident light surface of the light pipe. FIG. 3 shows that the prism 12 has a shape that is depressed toward an inner side with respect to an incident light surface 11 of the light pipe 1. An apex of the prism 12 substantially coincides with the center of the light emitted by the LED light source 4. A prism having this type of structure acts to make the angle of incidence of light incident within the light pipe larger, even when the light is emitted from the LED light source 4 having a small emergence angle. It is therefore not necessary for light emerging from the LED light source 4 with a large emergence angle to pass through the prism 12. The light emerging from the LED light source 4 possesses a wider angle when incident to the light pipe 1 as the apex angle of the prism 12 is made smaller. However, there is a problem in that the reflectance at a surface of the prism 1 becomes larger. Further, if the angle at which the light incident to the inner portion of the light pipe becomes too large, the angle of incidence of the light to the inner wall of the light pipe becomes smaller than the critical angle. Accordingly, the propagation efficiency in the inner portion of the light pipe decreases. It is therefore preferable to determine such a prism apex angle as to satisfy the following equation:

$$\phi < \pi/2 + \alpha/2 - \theta + \sin^{-1}[(1/n)\cdot\sin\theta] \quad \text{(Eq. 1)}$$

where $\alpha$ is the apex angle of the prism 12, $\theta$ is the angle of incidence of light incident to an inclined surface of the prism 12, $\phi$ is the critical angle in the inner wall of the side surface of the light pipe, and n is the index of refraction of the light pipe material.

The height of the prism 12 is determined by satisfying the conditions shown in Eq. 1, and by determining a limit of emergence angle at which light emitted from the LED light source 4 can be incident to the prism 12.

Figure 4A:
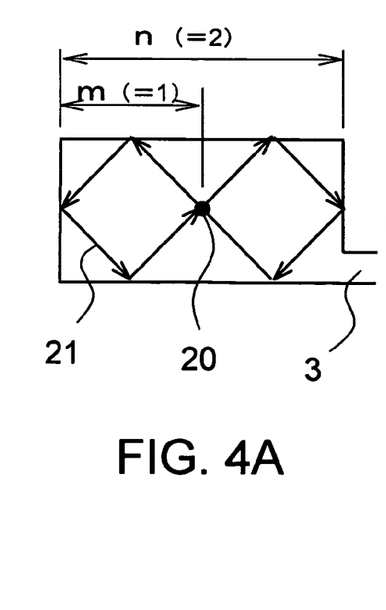
FIGS. 4A and 4B are cross sectional views that explain a relationship between light emission point positions of a light source in an incident surface of the light pipe and the behavior of the emitted light.
Figure 4B:
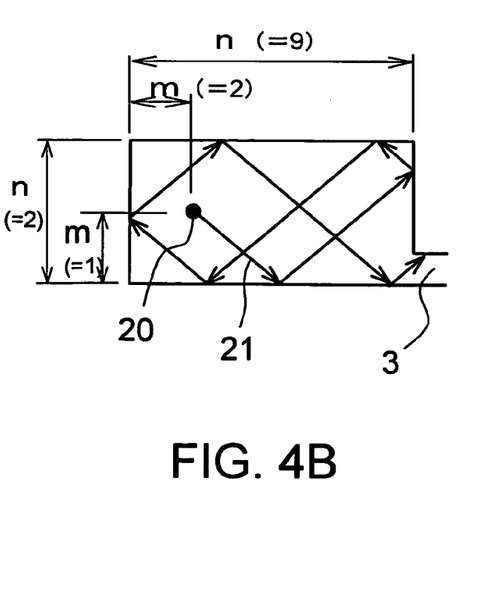

Changes in the behavior of light due to the light emission position of the LED light source 4 in the incident surface of the light pipe 1 are explained next using FIGS. 4A and 4B. FIG. 4A shows a case where a light emission point 20 of the LED light source 4 is positioned in the cross sectional center of the incident surface of the light pipe 1. FIG. 4B shows a case where the light emission point 20 of the LED light source 4 is positioned in the incident surface of the light pipe 1 separated from an outer side surface by ⅖ of the length of the long side of the incident surface. In the case of FIG. 4A, a light path 21 forms a closed loop when light from the light source propagates by being repeatedly and completely reflected by the inner walls of the light pipe. The light is not illuminated to the light guide plate 2 (not shown) from the joining portion 3. Although an example of a closed loop that possesses two loops in the longitudinal direction of the incident surface is shown here, closed loops possessing other whole number multiples of 2 rings, such as 4, 6, and 8, loops in the longitudinal direction may also be formed with the same emission point position. Similarly, a closed loop that possesses whole number multiples of 3 rings in the long side direction of the incident surface shown are formed for cases where the light emission point 20 of the LED light source 4 is positioned in a location separated from the side wall surface by ⅓ of the length of the long side of the incident surface. In other words, for cases where m=1 and n=3 in FIG. 4A. A circulation structure possessing a multiple of n rings in the long side direction will develop when the light emission point is positioned separated from the side wall surface by 1/n in the long side direction of the incident surface of the light pipe 1. The nature of this type of circulation propagation of light is such that, even for cases where the light emission point 20 is disposed in a position separated from the side wall surface by 1/n in the short side direction of the light pipe 1, rings will similarly develop, although the direction of the rings changes to the short side direction. Of course, even in the example shown by FIG. 4A, much of the light emerging from the LED light source 4 does not possess a circulation structure. Even the light that does possess a circulation structure may pass through the joining portion 3 and be illuminated to the light guide plate 2 (not shown).

It can be inferred from the example shown in FIG. 4B that the light emitted from the LED light source 4 may be shifted little by little from the closed loop structure each time the light is reflected by the wall surfaces, finally resulting in passage to the joining portion 3. When the position of the light emitting point 20 of the LED light source 4 is m/n (where m and n are each irreducible numbers other than 1, and m<n) from the short side, from the long side, or from both sides of the rectangular shape of the cross section of the light pipe shown, most of the light emitted by the LED light source propagates by being repeatedly reflected by the light pipe, and is necessarily transmitted through the joining portion 3. The transmitted light is then illuminated to the light guide plate. In other words, in this case a closed loop structure cannot form. Furthermore, the greater the value of m/n differs from the value of 1/k (where k is a natural number equal to or greater than 2), the larger the effect described above becomes. This is also true for cases where a prism like that shown in FIG. 3 is provided in the incident surface of the light pipe.

Figure 5:
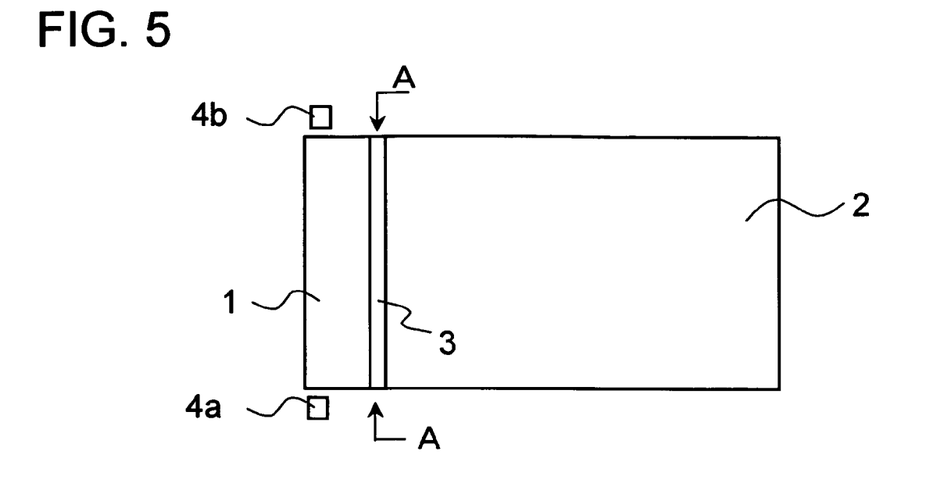
FIG. 5 is a planar view that shows LED light sources disposed one at a time in both ends of the light pipe.
Figure 6:
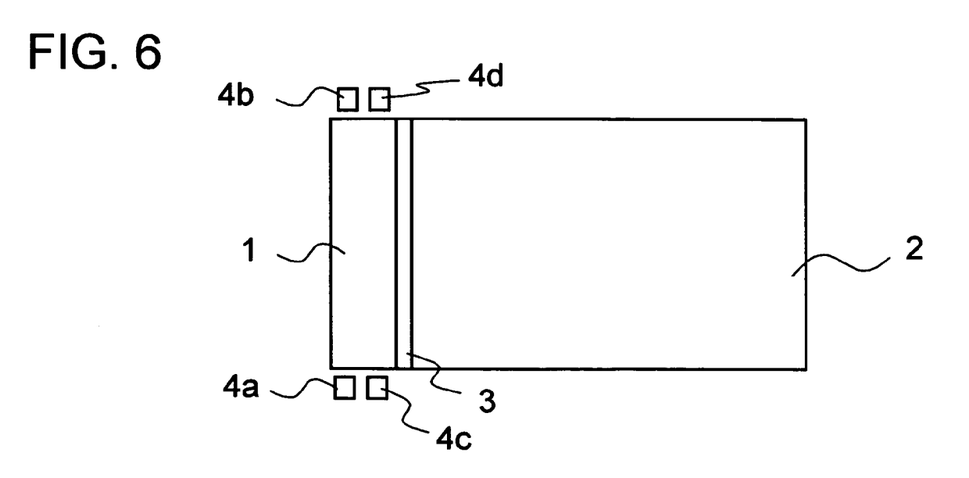
FIG. 6 is a planar diagram that shows LED light sources disposed two at a time in both ends of the light pipe.

A plurality of LED light sources can be disposed in the illuminating unit of the present invention by considering the arrangement of the light emitting points of the LED light sources. FIG. 5 and FIG. 6 show configurations for cases where a plurality of LED light sources are disposed. FIG. 5 is a planar view for a case where one LED light source is disposed at both ends of the light pipe 1, and FIG. 6 is a planar view for a case where two LEDs are disposed at both ends of the light pipe 1. As shown in FIG. 5 and FIG. 6, by disposing the LED light sources at the incident surfaces of both ends of the light pipe 1, the intensity distribution of light that passes through the joining portion 3 and is illuminated to the light guide plate 2 is symmetrical in the longitudinal direction of the light pipe. Accordingly, illumination to objects to be illuminated such as liquid crystal display elements by the light guide plate can be made very uniform. Further, by increasing the number of the LED light sources, the light flux guided through the joining portion 3 to the light guide plate 2 can be increased. As a result, very high brightness illumination becomes possible. LED light sources 4a, 4b, 4c, and 4d are, of course, all disposed in locations separated by lengths m/n (where m and n are each irreducible numbers other than 1) from the long side, the short side, or both the long side and the short side of the rectangular shape of the incident surface of the light pipe 1, as described above. Specifically, in this embodiment the LED light sources are disposed at locations separated from the wall surface of the light pipe by ⅖ of the length of the long side and the length of the short side.

Figure 7A:
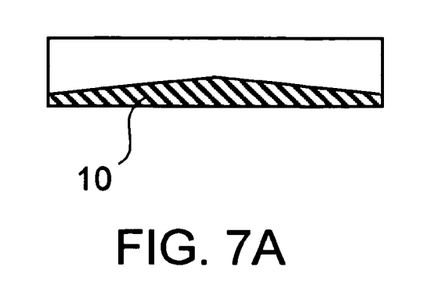
FIGS. 7A and 7B are cross sectional views that show connection portions between the light pipe and a light guide plate.
Figure 7B:
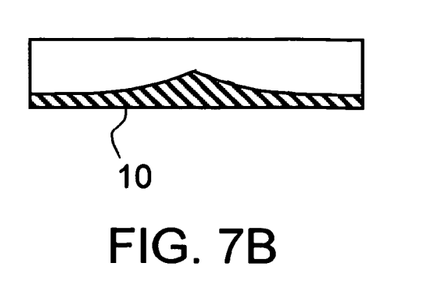

The cross sectional shape in the longitudinal direction of the joining portion 3 that integrally connects the light pipe 1 and the light guide plate 2 is explained next. FIGS. 7A and 7B show cross sectional views of the joining portion 3 of FIG. 5, cut along a line A-A. A shaded portion 10 indicates a cross section of the joining portion 3. FIG. 7A shows a case where the thickness of the joining portion 3 changes linearly with distance from the LED light source 4, and FIG. 7B shows a case where the thickness of the joining portion changes quadratically with distance from the LED light source 4. The shapes explained here are for cases where the LED light sources are disposed at the incident light surface of both ends of the light pipe 1 as shown in FIG. 5 and FIG. 6.

The optical power density of light emerging from the light pipe 1 becomes larger with increasing closeness to the LED light sources, and becomes smaller as distance from the LED light sources increases. The light intensity passing through the joining portion in the vicinity of the LED light sources is therefore stronger while the light intensity of the light passing through the center portion of the joining portion becomes weaker when the thickness of the joining portion 3 is constant. As a result, the light intensity of the center portion of the light illuminated to the light guide plate becomes weaker when the light guide plate is seen from the light pipe side. The center portion of the light illuminated from the light guide plate thus becomes correspondingly darker. In order to resolve this type of problem, the thickness of the joining portion 3 is reduced in the vicinity of large LED light sources where the optical power density is large, and increased at positions that are separated from LED light sources where the optical power density is small.

FIG. 7A shows a configuration in which the thickness of the joining portion 3 increases linearly toward the center portion of the light pipe from both incident surfaces of the light pipe where the LED light sources are disposed. The intensity of light incident to the light guide plate can be made very uniform by giving the joining portion this type of cross sectional shape, and it becomes possible to make the brightness of the illumination surface of the light guide plate very uniform as a result. Consider a case of a 0.7 mm thick light pipe as a specific example of this type of joining portion structure. The thickness of the joining portion in the incident surfaces of the light pipe is from 0.02 to 0.05 mm, while the thickness of the joining portion in the center portion of the light pipe is from 0.08 to 0.2 mm. The thickness of each portion of the joining portion is of course also dependent upon the way that the minute scattering structure members provided in the light guide plate are distributed.

The manufacture of a molding die for a structure like that of the joining portion shown in FIG. 7A is relatively simple. Strictly speaking, the intensity of light illuminated from the center portion of the light pipe 1 to the light guide plate 3 becomes relatively smaller compared to the light intensity in the vicinity of the LED light sources of the light pipe 1. It is therefore preferable that a small size illuminating unit having a short light pipe, or an illuminating unit having few demands relating to brightness distribution be employed for the structure of the joining portion shown in FIG. 7A.

On the other hand, with the joining portion structure shown in FIG. 7B, the height of the joining portion increases quadratically from the incident surfaces of the light pipe toward the center portion of the light pipe. The light quantity distribution of light incident from the light pipe to the light guide plate can be given substantially ideal uniformity by using this type of joining portion structure. The minute scattering members provided in the light guide plate can thus be made uniform in the longitudinal direction of the light pipe. The light guide plate thus becomes easier to manufacture as a result, and in addition, the brightness distribution of light illuminated to an object to be illuminated, such as a color liquid crystal display device, can be made very uniform.

Consider a case of a 0.7 mm thick light pipe as a specific example of joining portion structure shown in FIG. 7B. The thickness of the joining portion in the incident surfaces of the light pipe is from 0.02 to 0.04 mm, while the thickness of the joining portion in the center portion of the light pipe is from 0.2 to 0.3 mm.

It should be noted that, although a case in which a portion of the bottom surface side of the light pipe is joined to a portion of the bottom surface side of the light guide plate through the joining portion is explained above, a portion of an upper surface side of the light pipe may also be joined to the light guide plate through the joining portion.

Figure 8:
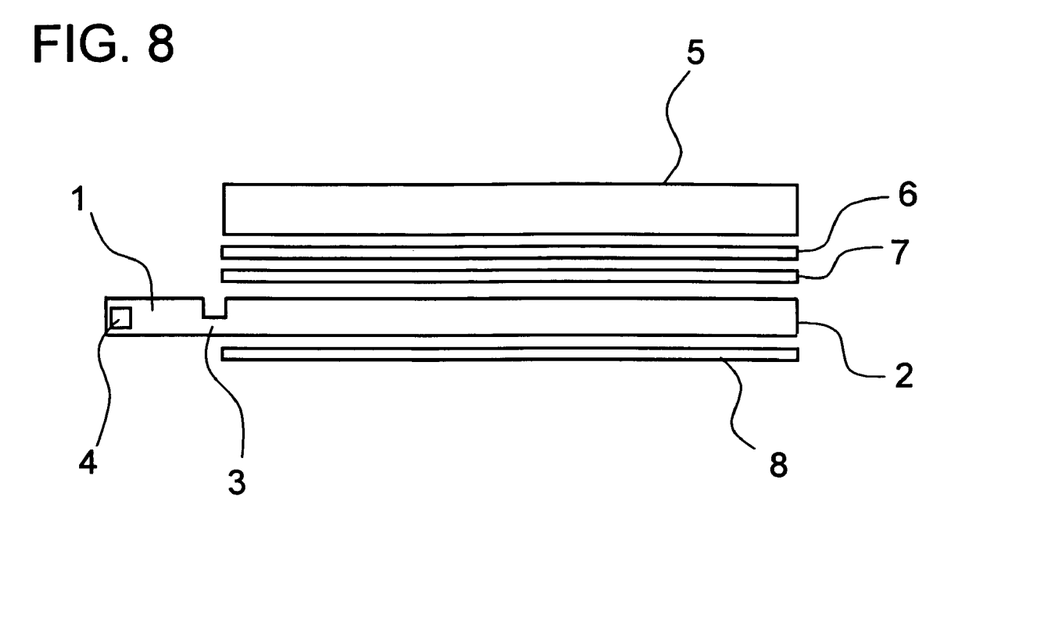
FIG. 8 is a schematic view that shows a cross sectional configuration of a display device that uses an illuminating unit of the present invention.

A configuration of a case where a color liquid crystal display device is illuminated using an illuminating unit like that described above is explained. FIG. 8 is a cross sectional view that schematically shows a configuration of a color liquid crystal display device according to the present invention. One LED light source 4 is disposed for each of the two incident surfaces of the light pipe 1. The one LED light source 4 shown in FIG. 8 is discussed here. The light emitting center of the LED light source 4 is disposed in a position toward the inside of the end surface of the light pipe 1 by 3/10 of the long side length of the rectangular shape of the cross section of the light pipe. Further, a convex shape prism having an apex angle of 120° and a height of 75 μm is provided in a position corresponding to the light emitting center of the LED light source 4 in the incident surface of the light pipe 1.

After light emerging from the LED light source 4 propagates through the inner portion of the light pipe 1, it is sufficiently mixed by repeated reflection, and then emerges from the emerging portion of the light pipe and passes through the joining portion 3 and becomes incident to the light guide plate 2. Minute scattering structure members whose haze value becomes larger with distance from the joining portion 3 are provided in the bottom surface of the light guide plate 2. A grain pattern can be used for the minute scattering structure members. The minute scattering structure members scatter light that is incident to the light guide plate 2 from the joining portion 3. In other words, a portion of the incident light is reflected, emerging from the upper surface (illuminating surface) of the light guide plate 2, while the remainder of the light passes through the bottom surface of the light guide plate 2. The light that passes through the bottom surface of the light guide plate 2 is reflected by a reflecting plate 8, returns again to the inner portion of the light guide plate 2, and then emerges from the upper surface of the light guide plate 2. The light intensity illuminated to the grain pattern becomes smaller with increasing distance from the joining portion 3, while the haze value of the grain pattern becomes larger with increasing distance from the joining portion 3. Accordingly, the amount of light that emerges from the upper surface of the light guide plate 2 becomes more uniform regardless of the distance from the joining portion 3.

The light that thus emerges from the light guide plate 2 passes in order through a second prism sheet 7 and a first prism sheet 6, illuminating color liquid crystal display elements 5. The first prism sheet 6 and the second prism sheet 7 are transparent sheet shape plates each having a periodic minute prismatic structure provided unidirectionally in one surface thereof. In general, the apex angle of the minute prisms is substantially 90°. Further, minute prismatic structure ridge lines provided to the first prism sheet 6 and minute prismatic structure ridge lines provided to the second prism sheet 7 are arranged in a mutually orthogonal orientation. It should be noted that, although a case in which two prism sheets are used is shown here, one or both of the prism sheets may also be omitted.

The color liquid crystal elements 5 control liquid crystal molecule orientation by applying a driver voltage between pixel electrodes in a matrix shape that sandwich liquid crystals within glass cells. The polarization state of light that passes through each of the pixels is controlled by the liquid crystal molecules whose orientation has been controlled. By using polarizing plates arranged orthogonally or in parallel to sandwich the glass cells, transmitted light or reflected light whose light intensity corresponds to the controlled polarization state can be obtained. An image can thus be displayed as a result. Active matrix type color liquid crystal elements where one TFT element is formed in each pixel and a driver voltage is controlled, and passive matrix type color liquid crystal elements in which a driver voltage is applied from an external portion directly to a transparent electrode formed in each pixel exist as the color liquid crystal elements 5. The illuminating unit of the present invention can use both types of color liquid crystal elements. In order for the color liquid crystal elements 5 to display a color image, color filters containing color pigments or dyes, having a film thickness that is predetermined according to prescribed rules, are provided to the color liquid crystal elements 5 so that specific wavelength band regions of light corresponding to the colors red (R), green (G), and blue (B) are selectively transmitted for each pixel. By turning each of the pixels on and off through utilizing the electro-optic effect of liquid crystals, light illuminated from the illuminating unit is thus controlled to turn on and off, and an arbitrary color image can be displayed. The illuminating unit of the present invention can also be applied to a non-color display device.

Although omitted from FIG. 8, a frame member that supports each of the elements in FIG. 8 and that is configured by a material possessing a high reflectance in order to efficiently reflect light that may leak from the side surfaces of the light guide plate 2, returning the light to the inner portion of the light guide plate 2. A light shielding plate is disposed on the upper surface of the light pipe 1 in order to block stray light from reaching the color liquid crystal display elements 5. A material in which a white color pigment is mixed into a polymer material, or a metal such as highly reflective aluminum may be used as a material forming the frame member.

The illuminating unit thus configured has a good two-dimensional brightness distribution, with a ratio between the minimum brightness and the maximum brightness equals to or greater than 70%. The illuminating unit also has a high light utilization efficiency, with a ratio of energy values between the total illuminating light and the light emerging from the LED light source being from 55 to 65%.

Embodiment 2

Figure 10:
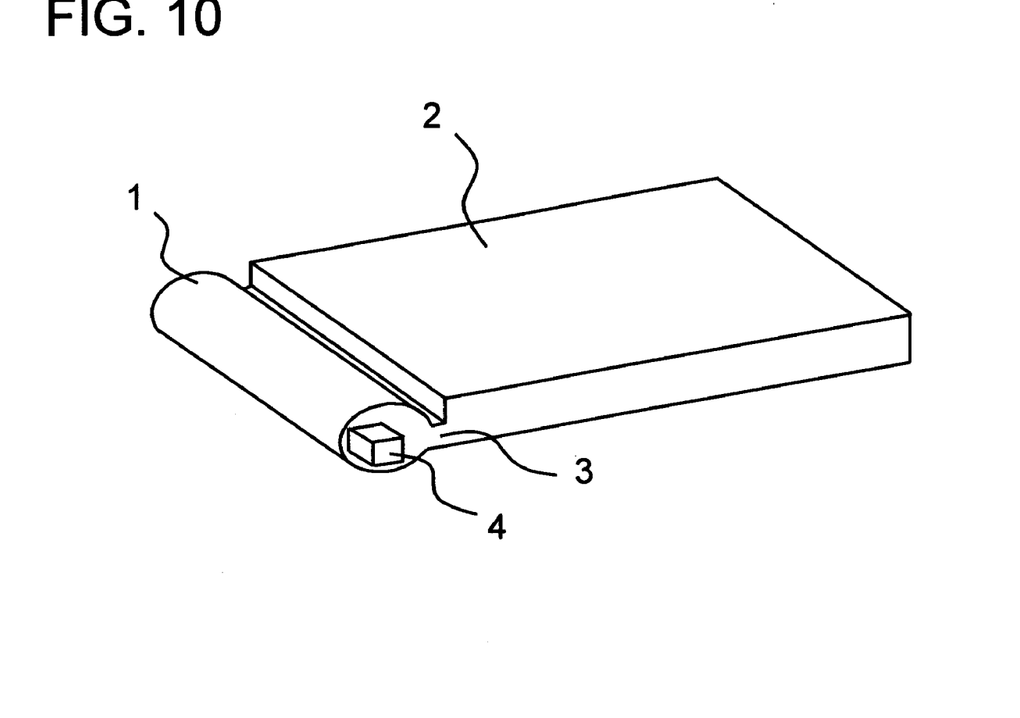
FIG. 10 is an external view that schematically shows an illuminating unit of the present invention.

FIG. 10 shows an external view of an illuminating unit of this embodiment. As shown in FIG. 10, the light pipe 1 of this embodiment has an elliptical cylinder shape, and light from the light source 4 has an elliptical shape on an incident surface to which the light is made incident. The light pipe 1 is joined to the light guide plate 2 by the joining portion 3 in portions including an elliptical cylinder shape bus line. Further, the LED light source 4 is disposed at the incident surface positioned on an end surface of the light pipe 1 in its longitudinal direction. The light pipe 1, the joining portion 3, and the light guide plate 2 are each formed by using the same transparent polymer material. Although a case where the thickness of the light guide plate 2 is greater than the thickness of the joining portion 3 is shown in FIG. 10, it is also possible for the thickness of the light guide plate to be made equal to the thickness of the joining portion.

Figure 11:
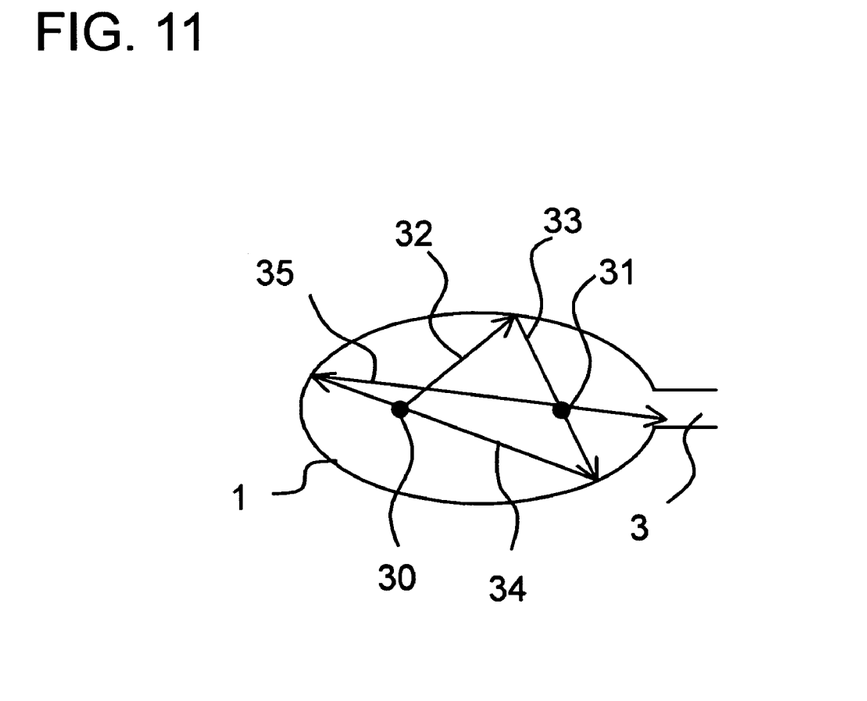
FIG. 11 is a cross sectional view that explains a relationship between light emission point positions of a light source in an incident surface of the light pipe and the behavior of the emitted light.

Referring to FIG. 11, setting of the light emitting position of the LED light source 4 with respect to the incident light surface of the light pipe 1 is explained next. The light pipe 1 is connected to the light guide plate 2 (not shown) through the connecting portion 3 in FIG. 11. The shape of the incident surface of the light pipe 1 is elliptical, and the ellipse possesses a first focus 30 and a second focus 31, as shown in FIG. 11. The LED light source 4 is disposed so that the center position of the emitted light point coincides with the first focus 30. When a plurality of LED light sources are used, the light centers of the light emitting points thereof may be placed at the first focus 30 and the second focus 31. Further, it is not strictly necessary for the center of the light emitted by the LED light source to coincide with a focus of the ellipse. The center of the emitted light may also be placed in the vicinity of a focus.

Using FIG. 11, consider a case where light emerging from the LED light source is incident to the first focus 30. At this point the light that passes through any one of the foci is completely reflected by the side surface of the light pipe 1, and necessarily passes through the other focus. Specifically, light that is incident to the light pipe from the LED light source and passes through the first focus 30 will be completely reflected by the side wall of the light pipe 1 as shown by a light ray 32, and then passes through the second focus 31 as a light ray 33. The light ray 33 is again completely reflected by the side wall of the light pipe 1, and again passes through the first focus 30 as a light ray 34. The light ray 34 is completely reflected by the side wall of the light pipe 1, and again passes through the second focus 31, and then passes out through the joining portion 3, toward the light guide 2. Although a light ray passing through the first focus 30 is explained here, a light ray that passes through the vicinity of the first focus 30 is also completely reflected by the side wall of the light pipe 1 and necessarily passes through the vicinity of the second focus 31. The light ray that passes through the vicinity of the second focus 31 is then completely reflected by the side wall of the light pipe 1, and necessarily passes through the vicinity of the first focus point 30. A majority of the light that is emitted from the LED light source therefore repeatedly passes through the vicinity of the first focus 30 and the vicinity of the second focus 31, provided that the center of the light emitted from the LED light source is arranged to be in the vicinity of the first focus 30. The light then passes out through the joining portion 3, into the inner portion of the light guide plate 2.

The light propagation within the elliptical cylinder shape light pipe 1 of this embodiment is similar to the content explained in Embodiment 1 using FIG. 2, and its explanation is therefore omitted here. Further, providing minute scattering structure members that do not depend upon the propagation direction of the propagating light on the bottom surface or the upper surface of the light guide plate 2 in order to make the brightness distribution of the illumination surface of the illuminating unit uniform is also similar to the content explained in Embodiment 1. Finally, providing a prism in the incident surface of the light pipe 1, and disposing a plurality of LED light sources are also similar to the content explained in Embodiment 1 using FIG. 3 and FIGS. 5 to 7.

Figure 12:
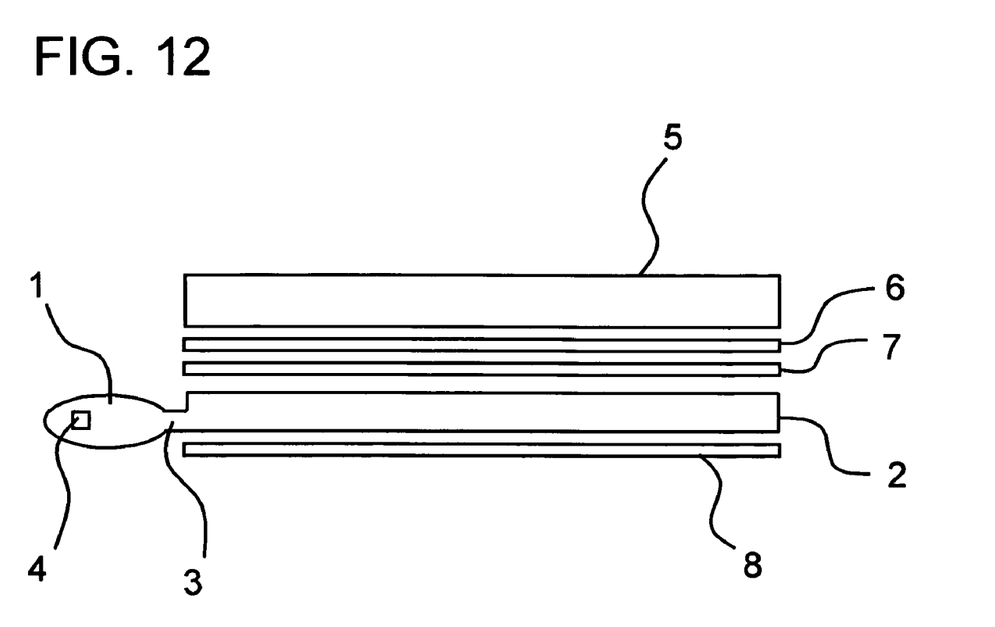
FIG. 12 is a schematic view that shows a cross sectional configuration of a display device that uses an illuminating unit of the present invention.

A configuration of a liquid crystal display device that uses an illuminating unit like that described above in this embodiment is explained next. FIG. 12 is a schematic diagram that shows an example of a cross sectional configuration of a color liquid crystal display device. One LED light source 4 is disposed at both incident surfaces of the light pipe 1. The center of the light emitted by the LED light source 4 is positioned in the location of the first focus of the elliptical shape that configures the incident surface of the light pipe 1 from the end surface of the light pipe 1. Further, an isosceles prism having a height of 75 μm and an apex angle of 120° is provided to the incident surface of the light pipe 1, in a perpendicular orientation with respect to the incident surface of the light pipe 1, in a position that corresponds to the center of the light emitted by the LED light source 4.

The light emerging from the LED light source 4 is repeatedly reflected in the inner portion of the light pipe 1, and is thus thoroughly mixed. The mixed light then passes through the joining portion 3 and is made incident to the light guide plate 2. The minute scattering structure members having a haze value that becomes larger with distance from the joining portion 3 are provided in the bottom surface of the light guide plate 2. Actions and effects, and details and arrangements of constituent elements with this type of configuration are similar to those of Embodiment 1, and explanations thereof are thus omitted here.

The LED light source 4 used in each of the embodiments described above may be a monochromatic light LED light source, and may also be a white color LED light source. A quasi-white color LED light source is generally widely known as a white color LED light source. With the quasi-white color LED light source, blue color light emerging from an LED light source that emits monochromatic blue color light is illuminated to a fluorescent member. Green color to red color light thus obtained is mixed with the base blue color light, and quasi-white color light is obtained.

However, it is preferable to use, as the LED light source 4, a white color LED light source including a first LED light source that emits monochromatic blue color light, and a second LED light source that emits monochromatic red color light. The monochromatic blue color light, the monochromatic red color light, and green color light that is made by wavelength conversion from the monochromatic blue color light through use of a fluorescent member, are additively mixed, thus obtaining white light. The white color LED light source supplements the red spectral intensity, which is insufficient with the quasi-white color LED light source described above, by use of the red color light from the second LED light source. Accordingly, very good color rendering can be obtained. Furthermore, sufficient light mixing can be performed by making the light emitted from the white color LED light source pass through the light pipe 1 of each of the embodiments described above.

Figure 9:
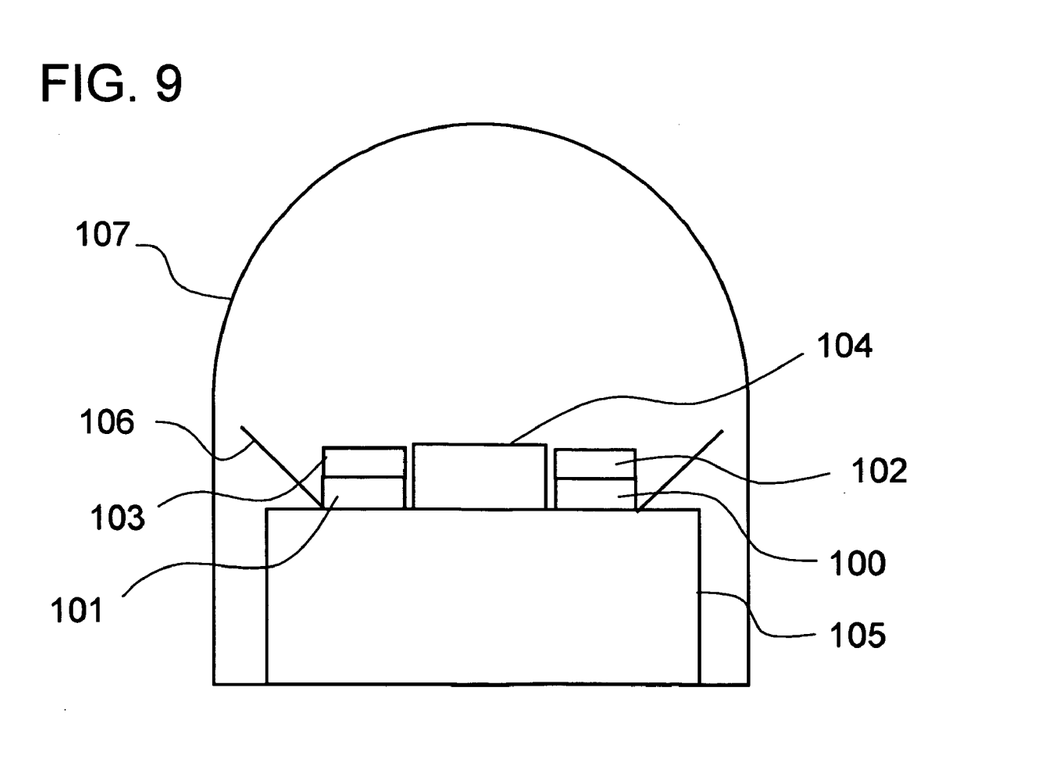
FIG. 9 is a cross sectional view that schematically shows a configuration of a white color LED light source.

A white color LED light source configured as described above is schematically shown in FIG. 9. A first blue color LED light source 100 and a second blue color LED light source 101 are LED light sources that emit blue color light and that are formed by using a material such as an InGaN, a GaN, or the like. A red color LED light source 104 is an LED light source that emits red color light and that is formed by using a material such as a GaP, a GaAlAs mixed crystal, or the like. The wavelengths of light emitted by the first blue color LED light source 100 and the second blue color LED light source 101 are specifically in a range of 430 to 470 nm. The wavelength of light emitted by the red color LED light source 104 is specifically in a range from 610 to 670 nm. In order to perform wavelength conversion on the blue color light emerging from the first blue color LED light source 100 and obtain green color light, a first fluorescent layer 102 that receives blue color light, thus exciting blue color light and green color light, is formed on an emerging surface of the first blue color LED light source 100. Similarly, a second fluorescent layer 103 is formed on an emerging surface of the second blue color LED light source 101. YAG (yttrium-aluminum-garnet) fluorescent material, oxides in which an additive element such as Tb, Ce, Eu, or Mn is added as a light emitting center, and the like may be used as materials that form the fluorescent layers 102 and 103. A fluorescent material of this type is not formed on the red color LED light source 104 in order to improve the efficiency at which red color light is emitted. A condenser lens 107 is formed by using a transparent polymer resin mold such as an acrylic or polycarbonate. The condenser lens 107 has an action to condense light emerging from each of the LED light sources to a target emerging angle. Further, a reflecting plate 106 is provided so that returning light reflected by an inner surface of the condenser lens 107 will effectively be emitted in a forward direction. As shown in FIG. 9, by providing the first blue color LED light source 100, the second blue color LED light source 101, and the red color LED light source 104 in close proximity, it becomes possible to achieve very uniform additive mixing, and color irregularities can be reduced. The spectrum of emitted light thus obtained covers a wide ranging spectrum of red, green, and blue colors. The spectrum possesses good rendering characteristics compared to a case where only blue color LED light sources having fluorescent members are used, without using a red color LED light source. Further, the first blue color LED light source 100, the second blue color LED light source 101, and the red color LED light source 104 may be adjusted independently. Good color balance can thus be achieved.

A polymer material such as an acrylic, poly-carbonate, or a cycloolefin resin can be used as the transparent polymer material that configures the light pipe 1, the joining portion 3, and the light guide plate 2 in each of the embodiments described above.

As described above, the illuminating unit of the present invention has a simple structure, and moreover, can achieve uniform, high light utilization efficiency. Not only does it become simple to assemble a side light type light guide plate having a light pipe according to the above configuration, but the reproducibility of assembly also increases. Accordingly, an illuminating unit having stable performance and quality can be provided at low cost.

An illuminating unit having uniform, high light utilization efficiency can thus be achieved by using a simple structure. Accordingly, the illuminating unit can also be applied to making small, portable information devices smaller, with higher brightness Examples of the small, portable information devices include cellular telephones, portable small televisions, portable game devices, PDAs, and small laptop computers. Further, a color liquid crystal display device having good color rendering can be achieved, which can also be applied to increasing color saturation of the color liquid crystal display device.

What is claimed is:

1. An illuminating unit comprising:
    a point light source;
    a light guide plate having an illuminating surface that is illuminated by light from the point light source;
    a light pipe having an incident surface and an emerging portion, the light pipe changing the direction of light incident on the incident surface so that the light emerges from the emerging portion; and a joining portion that integrally joins the emerging portion and the light guide plate;

wherein the light pipe has an elliptical cylinder shape, and the incident surface has an elliptical shape.

2. An illuminating unit according to claim 1; wherein the emerging portion of the light pipe includes an elliptical cylinder shape bus line.

3. An illuminating unit according to claim 1; wherein the center of light emitted by the point light source is in the vicinity of at least one of two foci included in the elliptical surface forming the incident surface of the light pipe.

4. An illuminating unit comprising:
a point light source;
a light guide plate having an illuminating surface that is illuminated by light from the point light source;
a light pipe having an incident surface and an emerging portion, the light pipe changing the direction of light incident on the incident surface so that the light emerges from the emerging portion; and
a joining portion that integrally joins the emerging portion and the light guide plate, the joining portion joining a bottom surface of the light pipe and a bottom surface of the light guide plate;
wherein the light pipe has a rectangular parallelpiped shape, and the incident surface has a rectangular shape; and
wherein the center of light emitted from the point light source is disposed in a position separated from at least one side of the rectangular shape incident surface of the light pipe by m/n (where m and n are each irreducible natural numbers other than 1, and m<n).

5. An illuminating unit according to claim 4; wherein the thickness of the joining portion becomes larger with increasing distance from the point light source.

6. An illuminating unit according to claim 5; wherein the thickness of the joining portion becomes linearly larger with increasing distance from the point light source.

7. An illuminating unit according to claim 5; wherein the thickness of the joining portion becomes quadratically larger with increasing distance from the point light source.

8. An illuminating unit according to claim 4; further comprising a prism formed in the rectangular shape incident surface of the light pipe, the prism having a depressed shape toward an inner side of the rectangular shape incident surface and having an apex point that coincides with the center of light emitted from the point light source.

9. An illuminating unit according to claim 1; further comprising minute scattering structure members provided in a bottom surface of the light guide plate, the haze value of the minute scattering structure members increasing with increasing distance from the light pipe.

10. An illuminating unit comprising:
a point light source;
a light guide plate having an illuminating surface that is illuminated by light from the point light source;
a light pipe having an incident surface to which light from the point light source is made incident, and an emerging portion from which the incident light from the incident surface emerges;
a joining portion that integrally joins the emerging portion and the light guide plate; and
a prism formed in the incident surface of the light pipe, the prism having a depressed shape toward an inner side of the incident surface and having an apex point that coincides with the center of light emitted from the point light source.

11. An illuminating unit according to claim 10; wherein the light pipe changes the direction of light incident from the incident surface so that the light emerges from the emerging portion.

12. An illuminating unit according to claim 11; wherein the light pipe has an elliptical cylinder shape, and the incident surface has an elliptical shape.

13. An illuminating unit according to claim 10; wherein the thickness of the joining portion becomes larger with increasing distance from the point light source.

14. An illuminating unit according to claim 13; wherein the thickness of the joining portion becomes linearly larger with increasing distance from the point light source.

15. An illuminating unit according to claim 13; wherein the thickness of the joining portion becomes quadratically larger with increasing distance from the point light source.

16. An illuminating unit according to claim 10; further comprising minute scattering structure members provided in a bottom surface of the light guide plate, the haze value of the minute scattering structure members increasing with increasing distance from the light pipe.

17. A display device comprising:
one or more display elements; and
an illuminating unit that illuminates the one or more display elements, the illuminating unit comprising a point light source; a light guide plate having an illuminating surface that is illuminated by light from the point light source; a light pipe having an incident surface and an emerging portion, the light pipe changing the direction of light incident on the incident surface so that the light emerges from the emerging portion; and a joining portion that integrally joins the emerging portion and the light guide plate; wherein the light pipe has an elliptical cylinder shape and the incident surface has an elliptical shape.

18. A display device according to claim 17; wherein the one or more display elements comprise one or more liquid crystal display elements.

* * * * *